United States Patent [19]

Komiyama et al.

[11] Patent Number: 5,346,522

[45] Date of Patent: Sep. 13, 1994

[54] METHOD AND APPARATUS FOR MOLDING OPTICAL GLASS ELEMENTS OR THE LIKE

[75] Inventors: Yoshizo Komiyama, Gotenba; Fumio Arai, Numazu; Yutaka Hasegawa, Numazu; Tetsuya Tanioka, Numazu; Hisataka Sugiyama, Shizuoka; Yoshiyasu Toyama, Numazu; Fusao Nakanishi, Fuji, all of Japan

[73] Assignee: Toshiba Machine Co., Ltd., Tokyo, Japan

[21] Appl. No.: 85,033

[22] Filed: Jul. 2, 1993

[30] Foreign Application Priority Data

Jul. 3, 1992 [JP] Japan .................. 4-200579

[51] Int. Cl.[5] ............................. C03B 23/00
[52] U.S. Cl. ........................... 65/64; 65/102; 65/157; 65/162; 65/29.19
[58] Field of Search ............ 65/29, 102, 157, 32.1, 65/64, 162, 319

[56] References Cited

U.S. PATENT DOCUMENTS

| | | | |
|---|---|---|---|
| 4,591,373 | 5/1986 | Sato | 65/29 |
| 5,264,016 | 11/1993 | Komiyama | 65/29 |
| 5,282,878 | 2/1994 | Komiyama et al. | 65/162 |

FOREIGN PATENT DOCUMENTS

62-216929 9/1987 Japan .
63-170226 7/1988 Japan .

*Primary Examiner*—Robert L. Lindsay
*Attorney, Agent, or Firm*—Oblon, Spivak, McClelland, Maier & Neustadt

[57] ABSTRACT

A method and apparatus are disclosed which place a glass blank on a lower mold arranged in an opposed relation to an upper mold, heat these molds and glass blank by an infrared lamp unit or high-frequency coil arranged around the molds and press-mold an optical glass element. In the method and apparatus, the infrared lamp unit or high-frequency coil is supported by a supporting mechanism such that it is movable along a direction in which the mold is moved. In cases where a relative position of the infrared lamp unit or high-frequency coil to the mold varies depending upon the shape and size of such molds or the shape and size of optical glass elements obtained, the infrared lamp or high-frequency coil is adjustably moved relative to the mold by a movable mechanism using a motor or air cylinder as an operation source. By using temperature sensors attached to both the molds, the temperatures of the upper and lower molds are controlled to a corresponding desired level.

29 Claims, 6 Drawing Sheets

METHOD AND APPARATUS FOR MOLDING OPTICAL GLASS ELEMENTS OR THE LIKE

BACKGROUND OF THE INVENTION

1. Field of the Invention

The present invention relates to a method and apparatus for press-molding optical glass elements or the like such as a lens for a camera and spectacles.

2. Description of the Related Art

The apparatus of this type is known which press-molding a glass blank between a pair of mutually opposite molds, upper and lower, through the heating of the molds and glass blank by means of a heating means located around these molds.

The heating means used for such apparatus includes means using an infrared lamp or a high-frequency coil.

From various studies on the application of heat by infrared lamp, the inventors have found that, if, depending upon the shape and size of a molding optical glass element, etc., and those of the molds, the relative position of the infrared lamps to the molds varies, a different temperature gradient occurs on the upper and lower molds upon the heating of these molds to a predetermined molding temperature and it takes a longer time to control the outputs of the individual infrared lamps so that a uniform temperature distribution can be obtained.

It has also been found that, even when the relative position of the infrared lamps to the molds varies after the upper and lower molds have been stabilized to a predetermined molding temperature, a temperature difference on the upper and lower molds is relatively slight and that the upper and lower molds can be controlled to a predetermined temperature by the output control of the individual infrared lamps.

In the apparatus for press-controlling a glass element through the heating of the glass element and molds by a high-frequency coil, the pair of molds, upper and lower, are controlled to a predetermined temperature normally by the detection of one of the upper and lower molding temperatures and output control of the high-frequency coil.

If two or more high-frequency coils are arranged near each other, no proper heating can be achieved due to their mutual interference and, for this reason, the upper and lower molds are heated with the use of one high-frequency coil. Since one high-frequency coil is employed, temperature control is carried out based on one or the other molding temperature and a temperature balance on the upper and lower molds is achieved by the relative positional relation of the high-frequency coil to the upper and lower molds in the longitudinal direction of the high-frequency coil, fine/coarse pitch of the high-frequency coil, and so on.

Figure 8A:
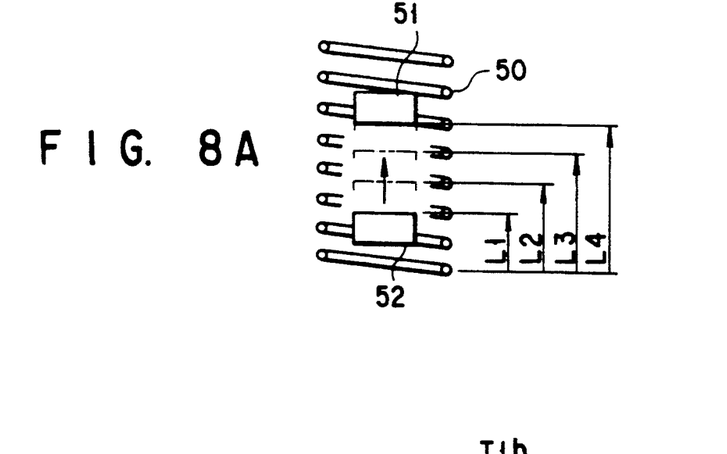
FIG. 8A is a side view showing a state in which a mold is moved relative to a high-frequency coil.
Figure 8B:
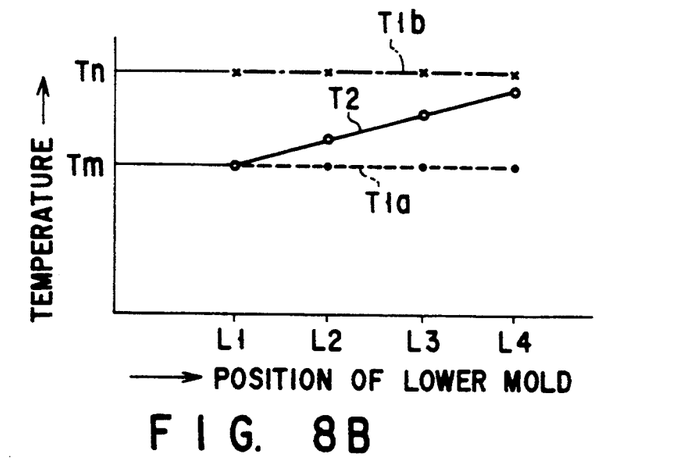
FIG. 8B is a view showing a variation of the movement and temperature of a mold relative to the high-frequency coil.

In the case where, as shown in FIG. 8A, a glass blank is press-molded by, for example, moving a lower mold 52 alone with an upper mold 51 fixedly held in place relative to a high-frequency coil 50, when the lower mold 52 is moved from a position $L_1$ near the lower end of the high-frequency coil 50 to a near-middle position $L_4$ thereof, the temperature of the lower mold 52 rises as indicated by a solid line $T_2$ in FIG. 8B even if a high-frequency output is constant.

This temperature rise indicates that the heating by the high-frequency coil 50 is more higher at the lower end side than at the middle side.

In the case where, with the lower mold 52 in the $L_1$ position, both the molds 51 and 52 are set at a temperature Tm in FIG. 8B, then with the lower mold 52 in the closed state corresponding to the $L_4$ position the lower mold 52 goes higher in temperature than the upper mold 51 since the upper mold 51 experiences no temperature variation as indicated by $T_{1a}$ in FIG. 8B.

For this reason it has been usual practice to initially set the upper mold 51 to a set temperature Tn higher by a predetermined amount as indicated by a dash-dot line in FIG. 8B and to secure a desired temperature difference or a uniform temperature between these molds when the lower mold 52 reaches the position $L_4$.

Figure 8C:
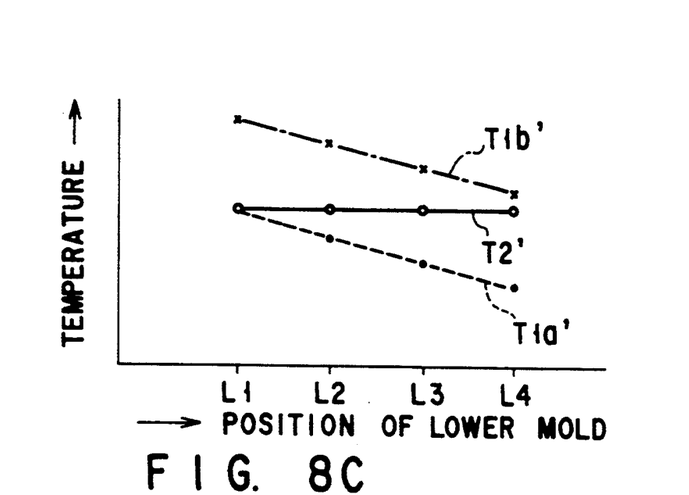
FIG. 8C is a variation of the movement and temperature of a mold relative to the high-frequency coil.

When, in the apparatus shown in FIG. 8A, the high-frequency coil 50 is output-controlled so as to have the temperature of the lower mold 52 maintained at a constant level as indicated by a solid line $T_2'$ in FIG. 8C, the temperature of the upper mold 51 is gradually lowered with a movement of the lower mold 52 from the $L_1$ position to the $L_4$ position as indicated by broken lines $T_{1a}'$ and $T_{1b}'$ in FIG. 8C and a relative temperature difference between the upper and lower molds 51 and 52 is substantially as shown in FIG. 8C.

It has also been the usual practice to initially heat the temperature of the upper mold 51 by a predetermined amount to a set level as indicated by the broken line $T_{1b}'$ in the case where the temperature of the lower mold 52 is used as a reference level as shown in FIG. 8C.

The temperature variation as indicated by the solid line $T_2$ can be suppressed by using a high-frequency coil of adequate length or a high-frequency coil of fine pitches. However, increasing the length of the high-frequency coil 50 involves various drawbacks and the coil pitch is very delicate to adjust. Further it takes a greater time to make such an adjustment as set out above.

SUMMARY OF THE INVENTION

It is accordingly the object of the present invention to provide a method and apparatus for molding optical glass elements or the like which are accurately achieved by readily and accurately controlling the heating of a pair of molds, upper and lower, by a heating means to their desired temperature.

According to one aspect of the present invention there is provided an apparatus for molding optical glass elements or the like, comprising:

a pair of molds, upper and lower, arranged in a mutually opposed relation;

heating means, provided around these molds, for heating the upper and lower molds and a glass blank placed between these molds;

mold moving means for enabling the upper and lower molds which are heated by the heating means to be set in press-contact with each other and for press-molding the glass blank between these molds;

supporting means for supporting the heating means along a direction in which the mold is moved by the mold moving means; and moving means for allowing the heating means which is supported by the supporting means to be adjustably moved relative to the mold.

According to another object of the present invention there is provided a method for molding optical glass elements or the like comprising the steps of:

placing a glass blank on a lower mold arranged in an opposed relation to an upper mold;

adjusting, relative to the position of the mold, the position of heating means provided around these molds;

heating, by the heating means to a desired level, the upper and lower molds and a glass blank arranged between these molds; and moving the upper and lower molds heated by the heating step relative to each other to set these molds in a press-contact state and press-molding the glass blank between the molds.

According to the aforementioned apparatus and method, if a relative position of the heating means to the mold varies depending upon the shape and size of the optical glass element or the like or the shape and size of the molds, the heating means is moved so as to control the temperatures of the upper and lower molds to a desired level. By so doing it is possible to mold optical glass elements of high accuracy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

One embodiment of the present invention will be explained below with reference to FIGS. 1 to 4.

Figure 1:
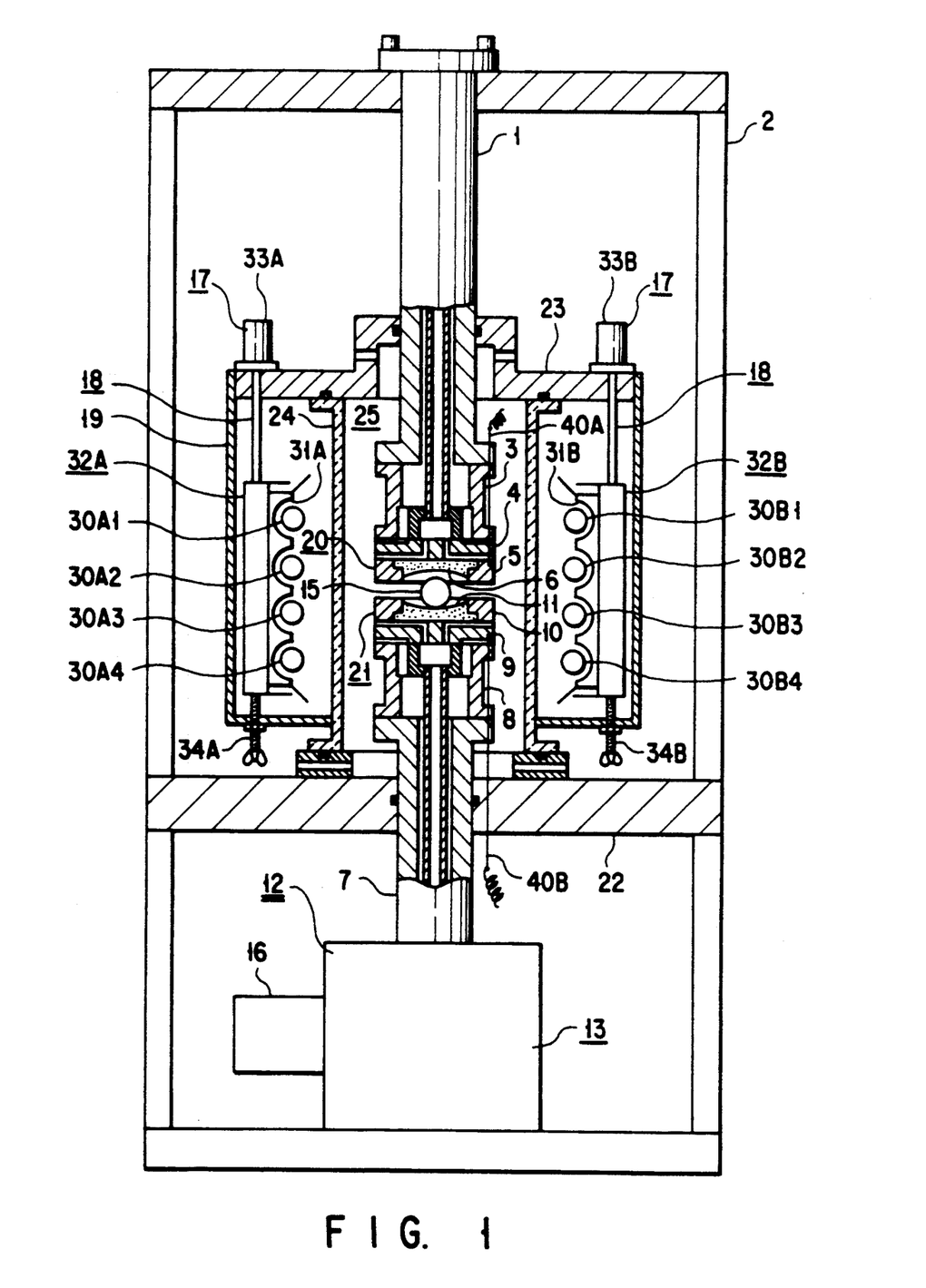
FIG. 1 is a diagrammatic view, partly in cross-section, showing a first embodiment of the present invention.

As shown in FIG. 1, a fixed shaft 1 is shown having an upper end side fixed to a top surface of a top section of a frame 2 and a lower end fixed to a fixed die plate 4 with a heat insulating member 3 interposed therebetween. An upper cavity die 6 together with a fixed die 5 is attached, by bolts not shown, to the fixed die plate 4 and made of, for example, ceramics.

A movable shaft 7 is located, as a lower shaft, coaxial with and in an opposed relation to the fixed shaft 1.

A movable die plate 9 is attached to the upper end side of the movable shaft 7 with a heat insulating member 8 interposed therebetween as in the case of the heat insulating member 3 and a lower cavity die 11 together with a movable die 10 is attached to the movable die plate 9 and made of, for example, ceramics.

The movable shaft 7 downwardly extends through a base 22 and is movable, while being given a desired raising force (pressing force), in an up/down direction at desired speeds by means of a die moving mechanism 12 serving as a die moving means with a servo motor 16 as a drive source and is adapted to be stopped to a desired position in accordance with a molding process. The die moving mechanism 12 comprises a servo motor 16 and a power transmitting mechanism 13 for converting a drive force of the servo motor 16 to a linear motion of the movable shaft 7.

A bracket 23 is mounted on the fixed shaft 1 such that it is movable in an up/down direction by a drive device not shown. A hollow-cylindrical chamber 24 is mounted on a bracket 23 in a manner to be movable in an up/down direction and made of a transparent material such as transparent quartz glass for allowing an infrared ray to pass.

The chamber 24 surrounds an upper mold 20 comprised of an assembly having the fixed die plate 4, fixed die 5 and upper cavity die 6 and a lower mold 12 comprised of an assembly having the movable die plate 9, movable die 10 and lower cavity die 11 and provides a molding chamber 25 between the bracket 23 and the base 22 which can be opened and closed by moving the bracket 23 in an up/down direction.

A pair of infrared lamp units 32A, 32B serving as a heating means are symmetrically provided below the bracket 23 with the chamber 24 surrounded concentrically therewith.

The infrared lamp units 32A and 32B are supported by a support mechanism 17 such that these lamp units are movable in a direction parallel to the fixed and movable shafts 1 and 7. The support mechanism 17 serves as a support means mounted on the bracket 23.

The support mechanism 17 is comprised of air cylinders 33A and 33B and the infrared lamp units 32A and 32B are attached to the plungers of the air cylinders 33A and 33B.

The air cylinders 33A and 33B serve also as an operation source for a movable mechanism 18 (moving means) for adjustably moving the lamp units 32A and 32B relative to the upper and lower molds 20 and 21.

The moving mechanism 18 comprises the air cylinders 33A, 33B attached to the bracket 23 and stoppers 34A and 34B made up of screw members for restricting amounts of movement by the air cylinders 33A and 33B.

The screw members (stoppers) 34A and 34B are threadably inserted through the lower end section of the frame 19 which is integral with the bracket 23. The screw members, being rotated, are movable in the up/down direction. The lower end faces of the lamp units 32A and 32B are supported by the upper end faces of the stoppers 34A and 34B whereby it is possible to perform the positional restriction of the lamp units 32A and 32B.

Further the lamp unit 32A comprises semi-circular arcuate infrared lamps $30A_1$ to $30A_4$ serving as a plurality of stages (4 stages) of heating means and a reflection mirror 31A covering the back sides of these infrared lamps 30A$_1$ to 30A$_4$.

The infrared lamp unit 32B comprises semi-circular arcuate infrared lamps 30B$_1$ to 30B$_4$ serving as a plurality of stages (4 stages) of heating means and a reflection mirror 31B covering the back sides of these infrared lamps 30B$_1$ to 30B$_4$.

Figure 2:
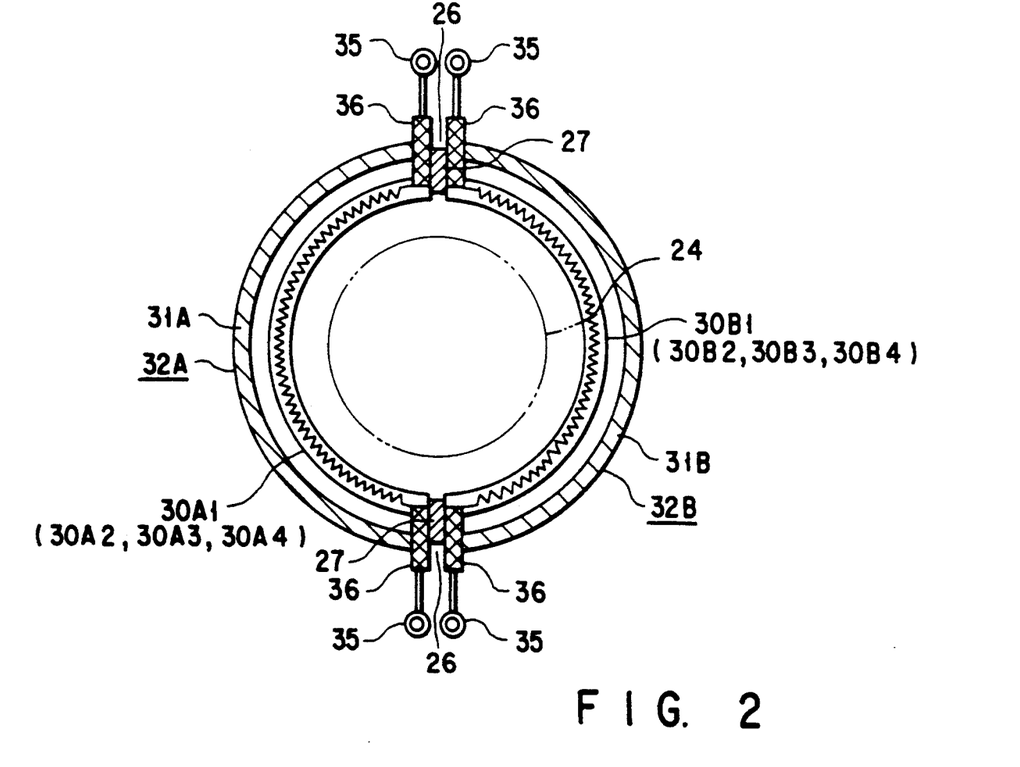
FIG. 2 is a plan view, in cross-section, showing an infrared lamp unit.

The infrared lamps 30A$_1$ to 30A$_4$ and 30B$_1$ to 30B$_4$ and reflection mirrors 31A and 31B, being set together, provide a substantially annular structure as shown in FIG. 2.

The reflection mirrors 31A and 31B are obtained by providing a plurality of acutely concave grooves on an aluminum block in those positions corresponding to the infrared lamps 30A$_1$ to 30A$_4$ and 30B$_1$ to 30B$_4$ and, after polishing the resultant aluminum block, gold-plating the acutely concave grooves of the aluminum block.

As shown in FIG. 2, terminals 35, 35 are derived out from both mating end sides of the respective infrared lamps 30A$_1$ to 30A$_4$ and 30B$_1$ to 30B$_4$ of an annular structure via gaps 26 and 26 defined between both the opposed ends of the reflection mirrors 31A and 31B and are connected to a power supply member not shown.

An insulator 36 is fitted over that portion of the respective terminal 35 which is situated at those gaps 26, 26. A spacer 27 made up of a heat-resistant elastic member is provided between the opposed insulators at the gap defined above.

The infrared lamp units 32A and 32B thus arranged have their position controlled by the moving mechanisms 18, 18 so that, as shown in FIG. 1, the upper two-stage infrared lamps 30A$_1$, 30A$_2$ and 30B$_1$, 30B$_2$ correspond to the upper mold 20 and the lower two-stage infrared lamps 30A$_3$, 30A$_4$ and 30B$_3$ and 30B$_4$ to the lower mold 21.

Thermocouples 40A and 40B are mounted, as temperature detectors, at the upper and lower cavity dies 6 and 11.

Figure 3A:
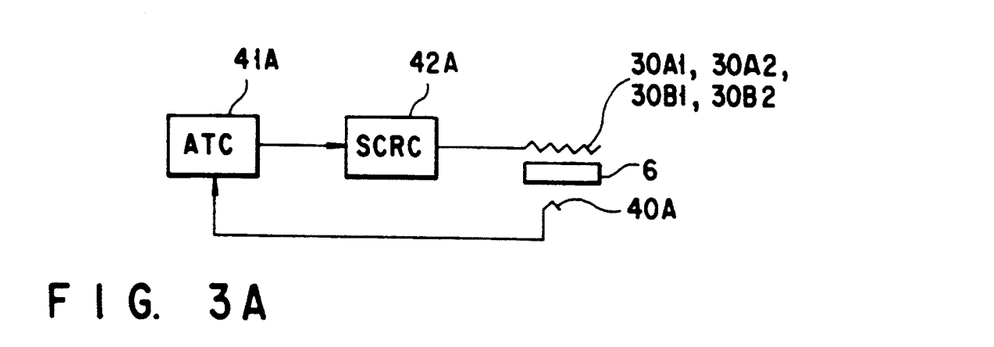
FIGS. 3A and 3B are block diagram showing a temperature control system.

FIG. 3A shows a temperature control system for the upper mold 20. The detected output of the thermocouple 40A is received by an automatic temperature controller (ATC)41A and, in order to enable the die cavity 6, that is, the upper mold 20, to reach its set temperature, the output of ATC41A is supplied to a thyristor type power controller (SCRC)42A and the infrared lamps 30A$_1$, 30A$_2$ and 30B$_1$ and 30B$_2$ have their outputs controlled.

Figure 3B:
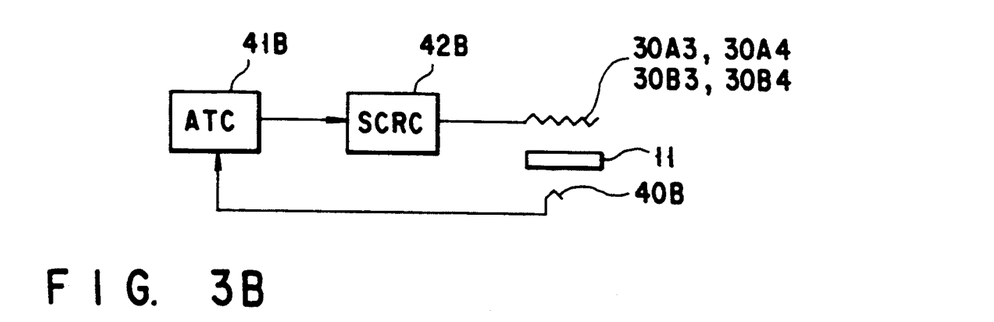

FIG. 3B shows a temperature control system for the lower mold 21. The detected output of the thermocouple 40B is received by an automatic temperature controller ATC41B and, in order to enable the cavity die 11, that is, the lower mold 21 to reach its set temperature, the output of ATC41B is supplied to a thyristor type power controller (SCRC)42B and the infrared lamps 30A$_3$, 30A$_4$ and 30B$_3$ and 30B$_4$ have their outputs controlled.

The operation of the present apparatus will be explained below. This is the case where a convex lens 33 mm in outer diameter was molded, noting that the fixed die 5 and movable die 10 were about 72 mm in outer diameter and the chamber 24 was 98 mm in outer diameter × 4 mm in thickness.

The fixed die 5 and movable die 10 were made of a tungsten alloy and these associated cavity dies 6 and 11 were made of SiC. As a glass blank use was made of optical glass having a maximum softening point of about 650° C.

As shown in FIG. 1, the molding chamber 25 was closed with a glass blank (preform) 15 placed on the lower cavity die 11 and heating was commenced, while introducing an N$^2$ gas (inert gas) into the molding chamber 25, after the concentration of oxygen in the molding chamber 25 was brought, through replacement, to a level at which the oxidation of the mold was not progressed.

At this time, the infrared lamp units 32A and 32B were symmetrically arranged in an up/down direction, while being compressed by the air cylinders 33A and 33B against the stoppers 34A and 34B, such that the upper two-stage infrared lamps 30A$_1$, 30A$_2$ and 30B$_1$, 30B$_2$ corresponded to the upper mold 20 and the lower two-stage infrared lamps 30A$_3$, 30A$_4$ and 30B$_3$, 30B$_4$ to the lower mold 21.

Figure 4A:
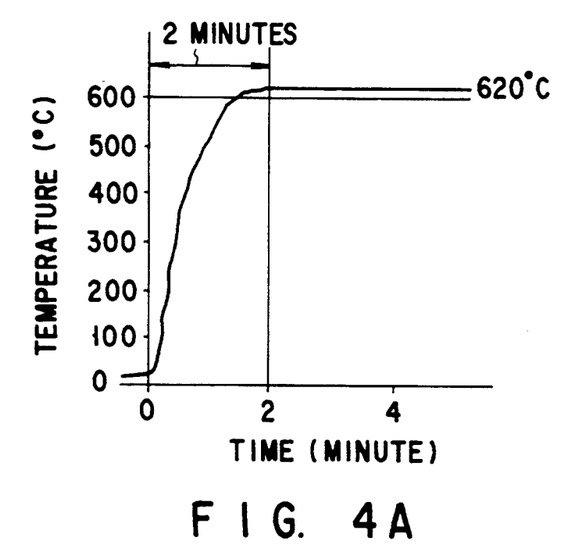
FIG. 4A is a view showing a temperature rise curve of molds in the embodiment of the present invention.

ATC41A (FIG. 3A) and ATC41B (FIG. 3B) were set to 620° C. and the upper mold 20 and lower mold 21 were heated from the ordinary temperature (about 20° C.) and it took about 2 minutes, as shown in FIG. 4A, to bring the set temperature to a stabilized one.

Then without changing the positions of the infrared lamp units 32A and 32B the lower mold 21 was raised by the servo motor 16 so as for the press-molding to be carried out. Then a molded article was annealed to provide a glass lens. The temperatures of the upper and lower molds 20 and 21 at the times of press-molding and annealing were able to be properly controlled by ATC's 41A and 41B with almost no temperature difference.

Figure 4B:
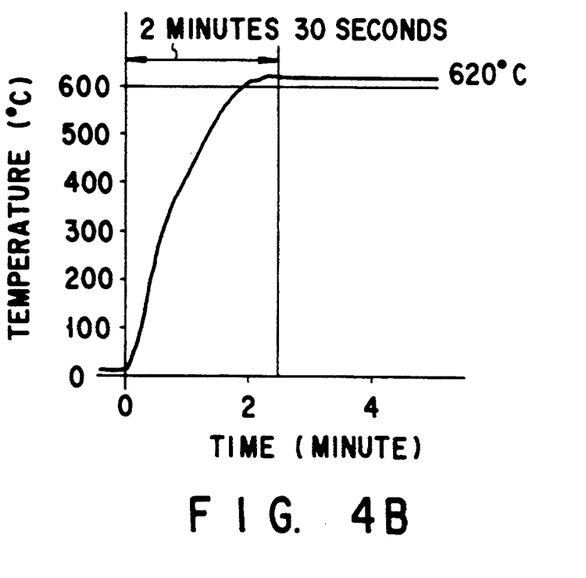
FIG. 4B is a view showing a temperature rise curve of molds in control.

When, without varying the other conditions, the infrared lamp units 32A and 32B were displaced by 10 mm to their upper positions from such a symmetrical position relative to the upper and lower molds 20 and 21 as set out above and heating was performed, then it took about two minutes and 30 seconds as shown in FIG. 4B to stabilize the set temperatures of the upper and lower molds 20 and 21. During the heating process in particular, a marked difference emerged in comparison with the present invention.

This is probably due to the heating of the upper and lower molds 20 and 21 in unbalanced relation. Thus it is considered that, when a force of heating is lowered at one of the molds 20 and 21, the other mold goes lower in temperature accordingly.

According to the present invention it is considered that the symmetrical positioning of the infrared lamps 30A$_1$ to 30A$_4$ and 30B$_1$ to 30B$_4$ relative to the upper and lower molds 20 and 21 ensures equal heating of both the molds 20 and 21 and that the lowering of a heating force can be suppressed to a small extent.

According to the present embodiment, if the shape and size of, for example, an optical glass blank to be molded as well as those of the molds vary and hence the relative positions of the infrared lamps 30A$_1$ to 30A$_4$ and 30B$_1$ to 30B$_4$ to the molds 20 and 21 vary, then the infrared lamps 30A$_1$ to 30A$_4$ and 30B$_1$ to 30B$_4$ are moved as set out below. Put it in more detail, the infrared lamps 30A$_1$ to 30A$_4$ and 30B$_1$ to 30B$_4$ are positioned relative to the upper and lower molds 20 and 21 at the time of heating at least preceding the press-molding, that is, prior to press-molding being made, through heating, with the glass blank 15 placed between the upper and lower molds. That is, the infrared lamps 30A$_1$ to 30A$_4$ and 30B$_1$ to 30B$_4$ are so positioned relative to the upper and lower molds 20 and 21 that a heating force acts most effectively, at a given ratio, upon the upper and lower molds 20 and 21.

By setting the infrared lamps $30A_1$ to $30A_4$ and $30B_1$ to $30B_4$ in place as set out above, it is possible to heat the upper and lower molds 20 and 21 at a predetermined temperature rise gradient for a brief period of time. Although the relative positions of the infrared lamps $30A_1$ to $30A_4$ and $30B_1$ to $30B_4$ to the upper and lower molds 20 and 21 vary by moving one or both of the upper and lower molds 20 and 21 after a predetermined temperature has been reached, that is, by moving the lower mold 21 according to the present invention as set out above, a temperature difference created by such a variation across the upper and lower molds 20 and 21 can be adequately suppressed by the output control of individual infrared lamps $30A_1$ to $30A_4$ and $30B_1$ to $30B_4$. By so doing it is possible to efficiently mold, for example, an optical glass element. It is needless to say that the infrared lamps $30A_1$ to $30A_4$ and $30B_1$ to $30B_4$ may be moved with the movement of the molds 20 and 21 upon press-molding.

Although, in the aforementioned embodiment, the infrared lamps units 32A and 32B are moved separately, these units may be moved as one unit.

This movement may be effected manually instead of using the air cylinders 33A and 33B.

Further the temperatures of the upper and lower molds 20 and 21 can be more accurately controlled at the time of not only heating but also press-molding and annealing by properly moving the infrared lamp units 32A and 32B, under instruction control, during press-molding with the use of a pulse motor or a servo motor and properly positioning these lamp units.

Further the infrared lamps $30A_1$ to $30A_4$ and $30B_1$ to $30B_4$ may have their outputs controlled by wholly controlling these lamps without being divided into two sections so that a balance is taken between the upper and lower molds 20 and 21 simply by controlling the position of the respective lamp.

The infrared lamps $30A_1$ and $30B_1$ for instance are not restricted to the four-stage arrangement. Either more or less stages of infrared lamps $30A_1$ and $30B_1$ may be employed instead or odd-number stage infrared lamps may be employed. Further the infrared lamp units 32A and 32B can be divided into two sections, upper and lower, in which case at least one of these sections which corresponds to the movable mold 20 may be moved in a manner to correspond to the position of the mold 20. By so doing it is possible to make various variations according to the method of the present invention.

According to the present invention it is possible to positively apply a desired temperature difference to the upper and lower molds 20 and 21 and, in this case, the infrared lamp units 32A and 32B arranged relative to the molds 20 and 21 need only to be displaced by a given amount from the symmetrical position.

Another embodiment of the present invention will be explained below with reference to FIGS. 5 to 7, noting that the FIG. 7 embodiment constitutes a modified one.

Figure 5:
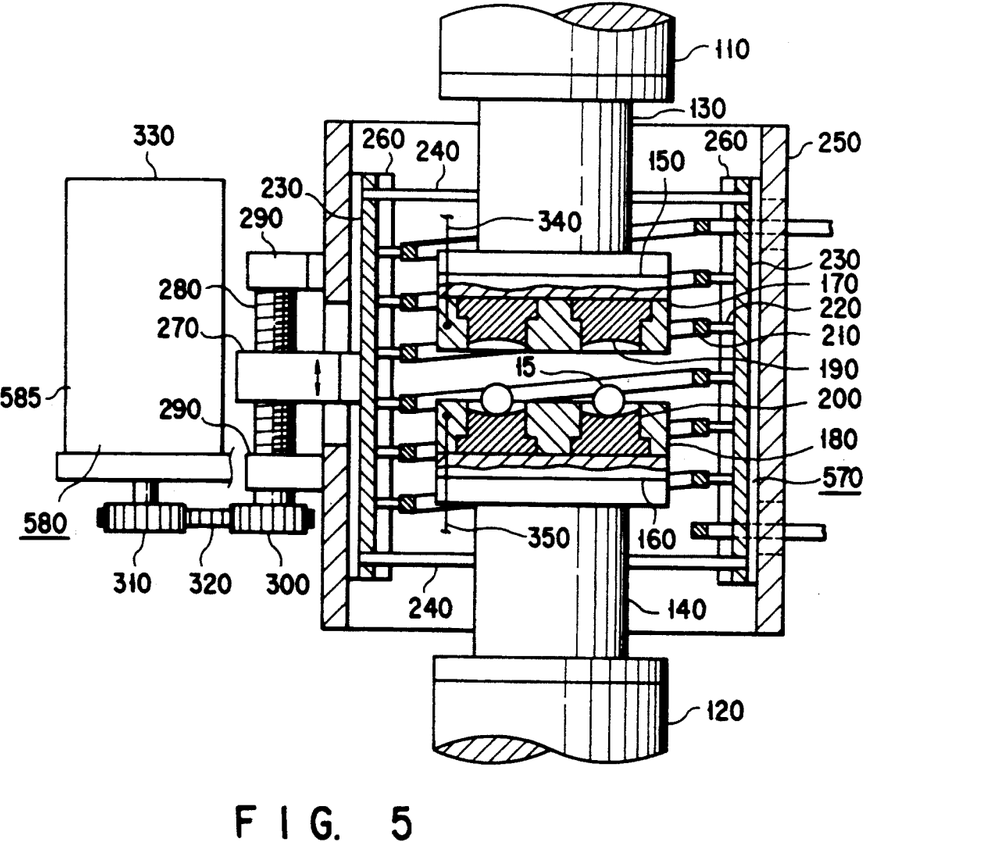
FIG. 5 is a cross-sectional view showing a major section of a second embodiment of the present invention.

As shown in FIG. 5, upper and lower press shafts 110 and 120 are arranged in a mutually opposed relation. An upper mold 170 is attached to the upper press shaft 110 through a heat-insulating joint 130 and high-frequency heatable die plate 150. A lower mold 180 is attached to the lower press shaft 120 through a heat-insulating joint 140 and die plate 160 heatable by a high-frequency.

A plurality of upper and lower cavity dies 190 and 200 are fitted in the molds 170 and 180 and held in place and have cavity surfaces corresponding to the upper and lower surfaces of optical elements to be molded.

Glass blanks 15 are placed on the corresponding lower cavity dies 200.

A high-frequency coil 210 for high-frequency heating is provided, as a heating means, around the upper and lower molds 170 and 180. The high-frequency coil 210 is supported by a support mechanism (supporting means) 570 such that it is freely movable in a direction parallel to the axes of press shafts 110 and 120.

The support mechanism 570 has such an arrangement as set out below. To be specific, the support mechanism 570 has a pair of slide plates 230,230 made of an electrically insulating material to which the high-frequency coil 210 is attached through a plurality of support pieces 220.

The slide plates 230, 230 are arranged to the right and left in FIG. 5 and coupled by coupling plates 240, 240 as one unit. The slide plates 230,230 are movable in a direction parallel to the axes of the press shafts 110 and 120 through slide guides 260 and 260 mounted on the frame 250.

The high-frequency coil 210 is so moved by a moving mechanism (moving means) 580 as to adjust its relative position to the molds 170 and 180.

The moving mechanism 580 includes an internally threaded member 270 mounted on the slide plate 230 attached to the high-frequency coil 210, a screw shaft 280 over which the internally threaded member 270 is threaded, and drive means 585 for driving the screw shaft 280.

In FIG. 5, the internally threaded member 270 is mounted to the left-side slide plate 230 in a manner to be threaded over the screw shaft 280.

The screw shaft 280 is arranged parallel to the press shafts 110 and 120 and is rotatably mounted at the corresponding bearings 290, 290 relative to the frame 250.

The screw shaft 280 receives a rotational force selectively in a normal or reverse direction by the drive means 585 to allow the internally threaded member 270 to be moved in the up/down direction.

The drive means 585 has, as a drive source, a motor 330 rotatable in the normal/reverse direction and transmits a drive force of the motor 330 to the screw shaft 280 through a drive force transmission system of a pulley 310, pulley 320 and pulley 320 to allow the screw shaft 280 to be rotated.

Figure 6:
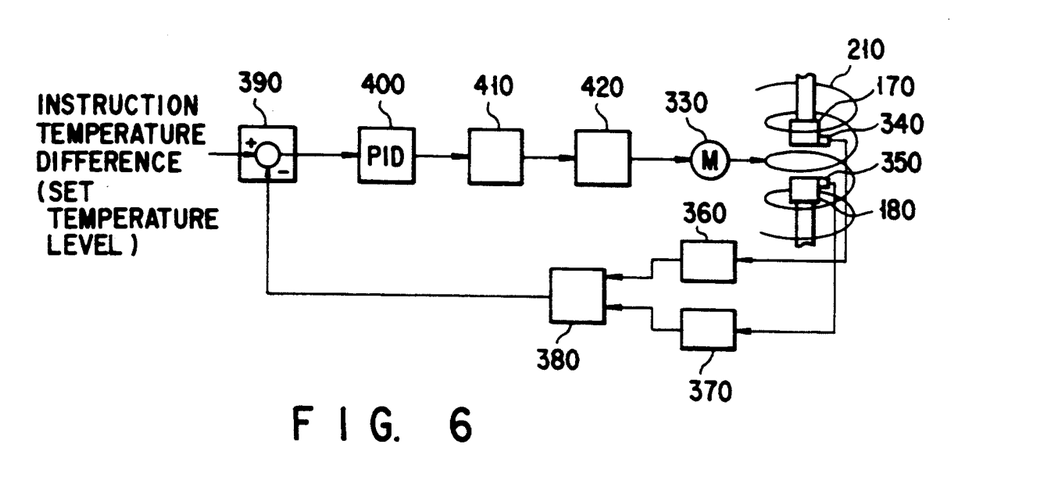
FIG. 6 is a block diagram showing a control system in the second embodiment.

Temperature sensors 340 and 350 are mounted, as temperature detecting means, on the upper and lower molds 170 and 180 and connected to corresponding temperature/voltage conversion circuits 360 and 370 as shown in FIG. 6. The outputs of the conversion circuits 360 and 370 are supplied to a temperature difference computing circuit 380.

In FIG. 6, an output level from the temperature difference computing circuit 380 is input to a matching circuit 390, the output of which is input to a PID controller 400. The output of the PID controller 400 is input to a positioning device 410, the output of which is input to a motor driver 420.

The high-frequency coil is moved by the motor 330 in an up/down direction so that a temperature difference output from the temperature difference computing circuit 380 becomes equal to an instruction temperature difference (including a zero level) given as a set value to the matching circuit 390.

The high-frequency coil 210 is of such a type that it controls the upper mold 170 or lower mold 180 to a desired temperature level by controlling the output of the high-frequency oscillator (not shown) by means of the temperature sensor 340 or 350.

The operation of the present apparatus will be explained below.

Let it be supposed that the high-frequency coil 210 has its output controlled by the temperature sensor 350 for the lower mold 180 and that an instruction temperature difference is set higher, by a predetermined value, at the upper mold 170 than at the lower mold 180.

After, with the upper press shaft 110 fixed, the lower press shaft 120 has been lowered and a glass blank 15 has been loaded on each corresponding lower cavity die 200, the lower press shaft 120 is raised to a preheating position as shown in FIG. 5 and heating is commenced through the use of the high-frequency coil 210.

The output of the high-frequency coil 210, that is, the output of the high-frequency oscillator not shown, is so controlled that the detected value of the temperature sensor 350 for the lower mold 180 becomes a desired one. By so doing, not only the lower mold 180 and upper mold 170 but also the die plates 150 and 160 are heated whereby the upper and lower cavity dies 190 and 200 and glass blank 15 are heated.

At this time, the upper and lower molds 170 and 180 are not always heated to a uniform temperature, as set out above, due to a difference, etc., in their relative position to the high-frequency coil 210, usually producing a temperature difference.

The temperature difference between the upper and lower molds 170 and 180 is computed by the temperature sensors 340, 350, temperature/voltage conversion circuits 360 and 370 and temperature difference computing circuit 380. That temperature difference is fed, as data, back to the matching circuit 390.

An instruction temperature difference higher at the upper mold 170 by the predetermined value than at the lower mold 180 is given as a set value to the matching circuit 390 where it is compared with a temperature difference coming, as data, from the temperature difference computing circuit 380. If there is any difference between the two as a result of comparison, the motor 330 in the drive means 585 as shown in FIG. 5 is driven sequentially through the PID controller 400, positioning device 410 and motor driver 420.

A drive force of the motor 330 is transmitted to the screw shaft 280 through the pulley 310, belt 320 and pulley 300 to allow the screw shaft 280 to be rotated. With the rotation of the screw shaft 280 the internally threaded member 270 in threadable engagement with the screw shaft is moved in the up or the down direction. Through the slide plate 230 provided integral with the internally threaded member 270, the high-frequency coil 210 is moved in the up or the down direction.

The temperature of the upper mold 170 is stabilized when it goes higher than that of the lower mold 180 by the predetermined value.

According to the present apparatus, the temperature of the lower mold 180 is held at a predetermined value by the output control of the high-frequency coil 210 and the temperature difference between the upper and lower molds 170 and 180 is held at a predetermined level by the up/down movement of the high-frequency coil 210 whereby the upper and lower molds 170 and 180 are controlled to their predetermined temperatures.

Just when, in a preheating position shown in FIG. 5, the die plates 150, 160, upper and lower molds 170, 180, cavities 190, 200 and glass blanks 15 are heated to a predetermined press temperature, the lower press shaft 120 is raised so as to carry out a press-molding operation.

At that time, the lower mold 180 is more highly heated, by the press operation, at the near-middle portion of the high-frequency coil 210 and a balance in a temperature difference between the upper and lower molds 170 and 180 is broken. Such a broken balance is fed, as data, from the temperature difference computing circuit 380 back to the matching circuit 390 and canceled by the movement of the high-frequency coil 210 by the motor 330 and the output control of the high-frequency coil 210 with the temperature of the lower mold as a reference. It is thus possible to maintain the temperatures of the upper and lower molds 170 and 180 at their predetermined level.

Figure 7:
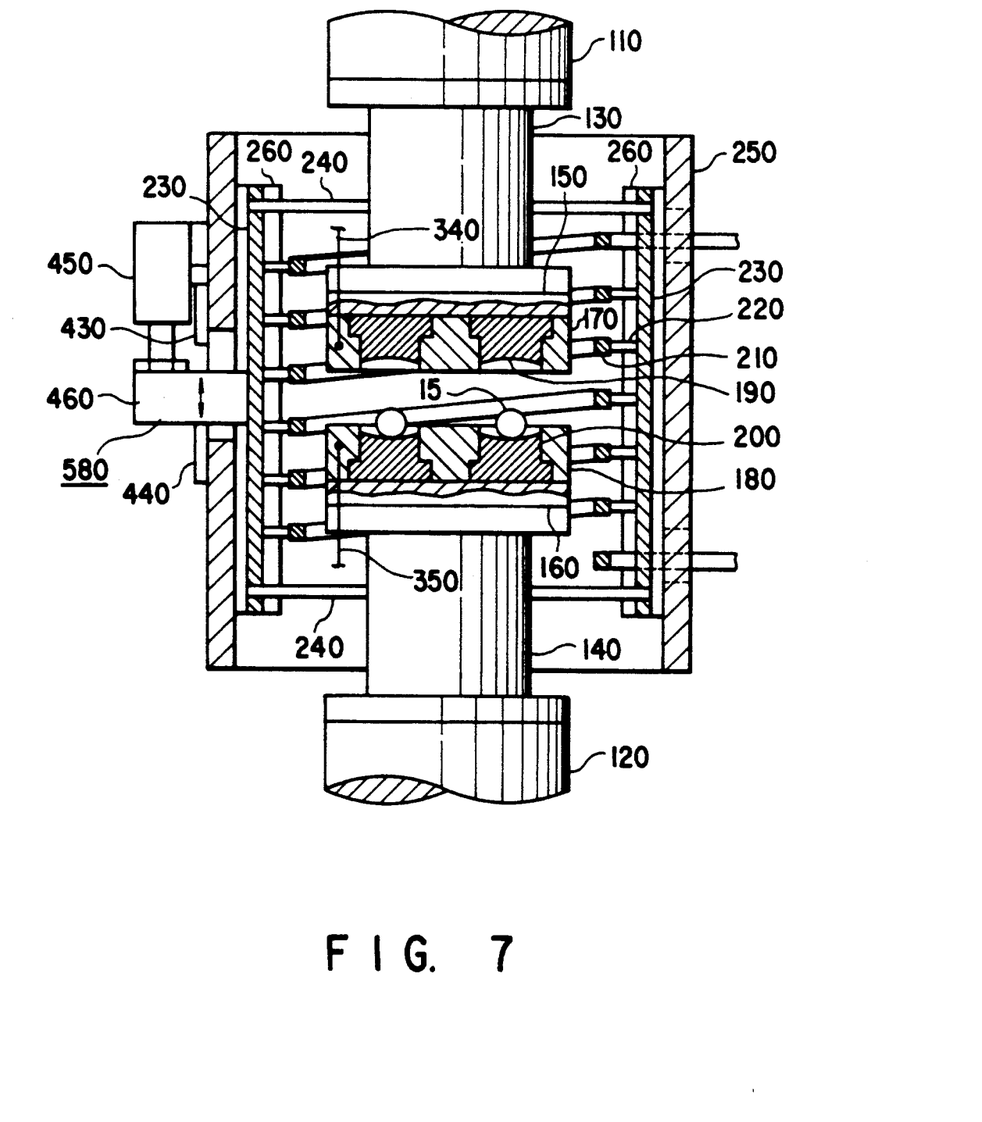
FIG. 7 is a cross-sectional view showing a major section of a variant of the present invention.

FIG. 7 shows a variant whose moving mechanism (moving means) 580 for moving the high-frequency coil 210 is different from that as shown in FIG. 5. The moving mechanism (valiant) 580 of FIG. 7 comprises an arm 460 provided integral with the slide plate 230 with the high-frequency coil 210 mounted thereon, an air cylinder 450 for moving the arm 460 through a coupled plunger and upper and lower stoppers 430 and 440 for restricting an amount of movement by the air cylinder 450.

The lower stopper 440 is provided in a position corresponding to the preheating position of the lower mold 180 and the upper stopper 430 is provided in a position corresponding to a press-molding position where the lower mold 180 is contacted with the upper mold 170 by its upward movement. Without any feedback of the temperatures of the upper and lower molds 170 and 180, the slide plate 230 is moved, by a simple drive device such as the air cylinder 450, in interlock with the movement of the lower mold 180 to those positions restricted by the upper and lower stoppers 430 and 440.

The upper and lower stoppers 430 and 440 are so mounted as to allow their positions to be adjusted. In the preheating position and press-molding position of the lower mold 180 the upper and lower molds 170 and 180 are so set as to be maintained at their desired temperature.

In the aforementioned embodiment, although the lower mold 180 has been explained as being moved in the up/down direction with the upper mold 170 fixed to a predetermined position so that a press-molding operation is carried out, the upper mold 170 can be made movable in the up/down direction with the lower mold 180 fixed or it is also possible to move both the upper and lower molds 170 and 180 in the up/down directions according to the present invention.

The present invention is not restricted to the aforementioned embodiments only and various changes or modifications of the present invention can be made without departing from the spirit and scope of the present invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for molding optical glass elements, or the like comprising:

a pair of molds, upper and lower, arranged in a mutually opposed relation;

heating means, provided around these molds, for heating the upper and lower molds and a glass blank placed between these molds;

mold moving means for enabling the upper and lower molds which are heated by the heating means to be set in press-contact with each other and for press-molding the glass blank between these molds;

supporting means for supporting the heating means along a direction in which the mold is moved by the mold moving means; and moving means for allowing the heating means which is supported by the supporting means to be adjustably moved relative to the mold.

2. An apparatus for molding optical glass elements or the like, comprising:

a pair of molds, upper and lower, mutually oppositely arranged in a molding chamber kept under an inert gas atmosphere;

an infrared lamp unit provided around these molds to heat the upper and lower molds and a glass blank placed between these molds;

mold moving means for enabling the upper and lower molds which are heated by the infrared lamp unit to be set in press-contact with each other and for press-molding the glass blank between these molds;

supporting means for supporting the infrared lamp unit such that the lamp unit is movable along a direction in which the mold is moved by the mold moving means; and moving means for allowing the infrared lamp unit which is supported by the supporting means to be adjustably moved relative to the molds.

3. The apparatus according to claim 2, wherein the infrared lamp unit comprises infrared lamps and reflection mirrors provided behind the infrared lamps.

4. The apparatus according to claim 3, wherein the infrared lamp unit is comprised of a substantially annular array of two semi-circular infrared lamps.

5. The apparatus according to claim 3, wherein the infrared lamp unit is comprised of a substantially annular array of two semi-circular infrared lamps and of two semi-circular reflection mirrors.

6. The apparatus according to claim 3, wherein the substantially annular circular arrays of semi-circular infrared lamps and reflection mirrors are provided in a plural stage.

7. The apparatus according to claim 3, wherein the substantially annular array of infrared lamps is arranged concentric with a hollow cylindrical chamber defining a molding chamber.

8. The apparatus according to claim 5, wherein the infrared lamp unit is of such a type that terminals provided at each joint of its substantially annular array are extracted out of a corresponding gap defined between the two reflection mirrors constituting the substantially annular array.

9. The apparatus according to claim 8, wherein the terminals of the infrared lamp unit are of such a type that an insulator is fitted over each terminal at each gap defined between the two reflection mirrors constituting the substantially annular array.

10. The apparatus according to claim 9, wherein a spacer is provided, as a heat-resistant elastic member, between a plurality of insulators at two gaps defined between the two reflection mirrors constituting the substantially annular array.

11. The apparatus according to claim 7, wherein the cylindrical chamber is formed of a material which allows transmission of most of an infrared ray emitted from the infrared lamp.

12. The apparatus according to 11, wherein the material of which the cylindrical chamber is formed is made of transparent quartz glass.

13. The apparatus according to claim 3, wherein the reflection mirrors are of such a type that their polished surfaces are gold plated.

14. The apparatus according to claim 2, wherein the moving means enables those infrared lamps of the infrared lamp unit to be positioned relative to the upper and lower molds in an up/down direction in a symmetrical relation.

15. The apparatus according to claim 2, wherein the moving means comprises an air cylinder connected by a plunger to the infrared lamp unit and stopper means for restricting an amount of movement by the air cylinder.

16. The apparatus according to claim 15, wherein the screw means is made up of a variable screw whose position is variable.

17. The apparatus according to claim 2, wherein the upper and lower molds are attached to corresponding shafts through a hollow, heat-resistant member.

18. The apparatus according to claim 17, wherein the hollow, heat-resistant member is made of a material which allows transmission of most of an infrared ray emitted from the infrared lamp.

19. The apparatus according to claim 2, wherein the moving means is responsive to detected temperatures of the upper and lower molds for controllably moving the infrared lamps to obtain a desired temperature level.

20. The apparatus according to claim 2, wherein the moving means enables the position of the infrared lamp to vary in interlock with the positional change of the mold.

21. An apparatus for molding optical glass elements or the like, comprising:

a pair of molds, upper and lower, mutually oppositely arranged in a molding chamber kept under an inert gas atmosphere;

a high-frequency coil provided around these molds to heat the upper and lower molds and a glass blank placed between these molds;

mold moving means for enabling the molds which are heated by the high-frequency coil to be set in press-contact with each other and for press-molding the glass blank between these molds;

supporting means for supporting the high-frequency coil such that the high-frequency coil is movable along a direction in which the mold is moved by the mold moving means; and moving means for allowing the high-frequency coil which is supported by the supporting means to be adjustably moved relative to the mold.

22. The apparatus according to claim 21, wherein the supporting means comprises a plurality of slide plates made of an electrically insulating material and provided with the high-frequency coil attached thereto by a plurality of support pieces; coupling plates for coupling together the slide plates; and slide guides for guiding the slide plates along a direction in which the mold is moved.

23. The apparatus according to claim 21, wherein the moving means is responsive to detected temperatures of the upper and lower molds for moving the high-frequency coil so that these temperatures are controlled to a desired level.

24. The apparatus according to claim 21, wherein the moving means comprises an internally threaded member provided on the slide plate with the high-frequency coil attached thereto; a screw shaft set in threaded engagement with the internally threaded member; and drive means for driving the screw shaft.

25. The apparatus according to claim 21, wherein the moving means comprises an arm provided integral with the slide plate with a high-frequency coil attached thereto; an air cylinder for moving the arm by a plunger; and stoppers for restricting an amount of movement by the air cylinder.

26. The apparatus according to claim 21, wherein the moving means is of such a type that it can variably move the position of the high-frequency coil in interlock with the positional movement of the mold.

27. A method for molding optical glass elements or the like comprising the steps of:
 placing a glass blank on a lower mold arranged in an opposed relation to an upper mold;
 adjusting, relative to the position of the mold, the position of heating means provided around these molds;
 heating, by the heating means to a desired level, the upper and lower molds and a glass blank arranged between these molds; and
 moving the upper and lower molds heated by the heating step relative to each other to set these molds in a press-contact state and press-molding the glass blank between the molds.

28. A method for molding optical glass elements or the like comprising the steps of:
 placing a glass blank on a lower mold arranged in an opposed relation to an upper mold;
 adjusting, relative to a position of the mold, a position of an infrared lamp unit provided around these molds;
 heating, by the infrared lamp to a desired level, the upper and lower molds and a glass blank arranged between these molds; and
 moving the upper and lower molds heated by the heating step relative to each other to set these molds in a press-contact state and press-molding the glass blank between the molds.

29. A method for molding optical glass elements or the like comprising the steps of:
 placing a glass blank on a lower mold arranged in an opposed relation to an upper mold;
 heating, by a high-frequency coil to a desired level, these molds and a glass blank arranged between the upper and lower molds, the high-frequency coil being provided around the upper and lower molds;
 adjusting the position of the high-frequency coil relative to the mold in accordance with that temperature level to which the mold is heated; and
 moving the upper and lower molds heated by the heating step relative to each other to set these molds in a press-contact state and press-molding the glass blank between the molds.

* * * * *